United States Patent [19]

Matthews

[11] Patent Number: 5,577,751
[45] Date of Patent: Nov. 26, 1996

[54] REMOVABLE TRUCK BED TRAILER HITCH

[76] Inventor: Mark L. Matthews, Rt. 5, Box 398, 2744 Rockford Rd., Yadkinville, N.C. 27055

[21] Appl. No.: 354,468

[22] Filed: Dec. 12, 1994

[51] Int. Cl.⁶ ..................................................... B60D 1/06
[52] U.S. Cl. ........................ 280/415.1; 280/495; 280/901
[58] Field of Search ............................. 280/415.1, 423.1, 280/433, 491.1, 495, 901

[56] References Cited

U.S. PATENT DOCUMENTS 4,546,994 10/1985 Taylor ................................. 280/423.1
5,016,898 5/1991 Works et al. ........................... 280/433
5,104,138 4/1992 Allen ..................................... 280/901
5,143,393 9/1992 Meyer ................................. 280/491.1
5,344,172 9/1994 Jaun ..................................... 280/415.1

Primary Examiner—Kevin Hurley

[57] ABSTRACT

A hitch for towing a trailer behind a truck. The inventive device includes a mounting assembly securable to a frame of the truck. A receiving assembly is secured to the mounting assembly for receiving a vertical stanchion having a ball hitch secured to an upper end thereof. A coupling assembly projects through both the receiving assembly and the vertical stanchion to removably couple the two together.

6 Claims, 3 Drawing Sheets

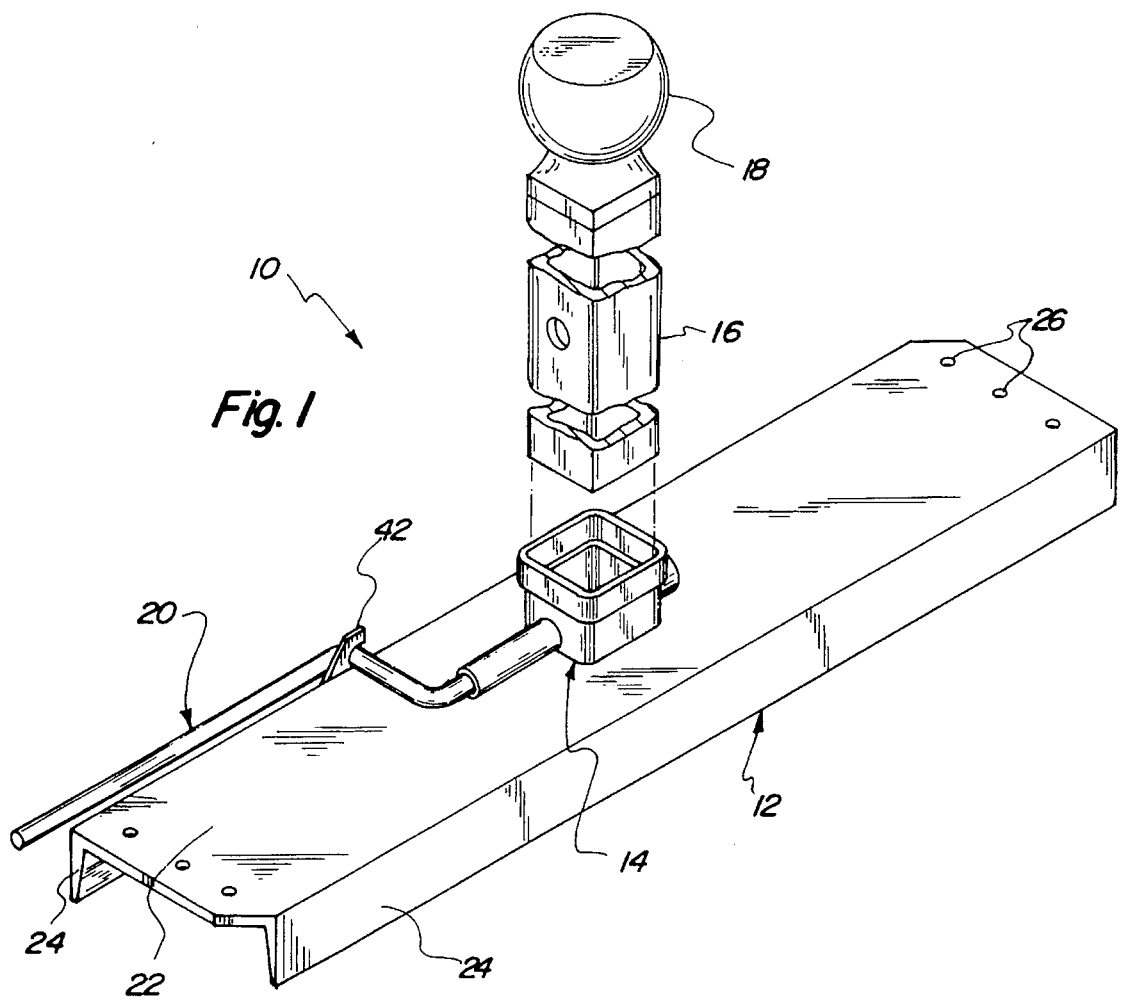
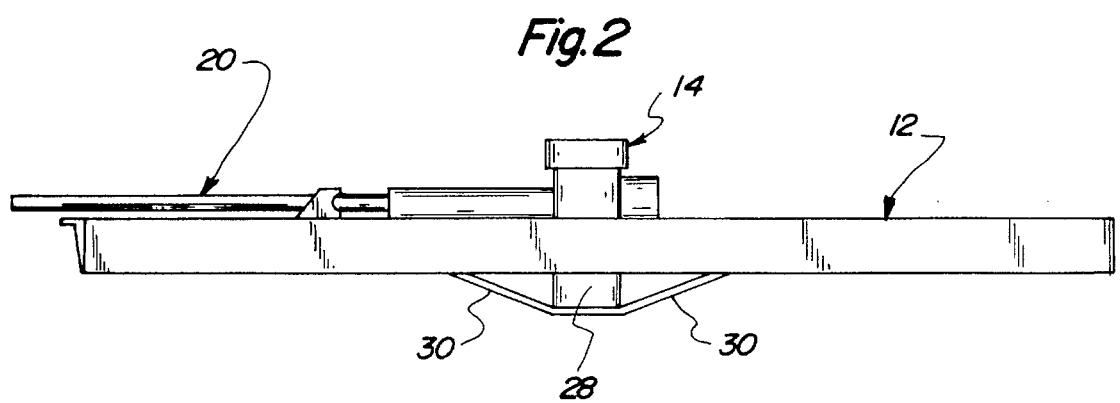

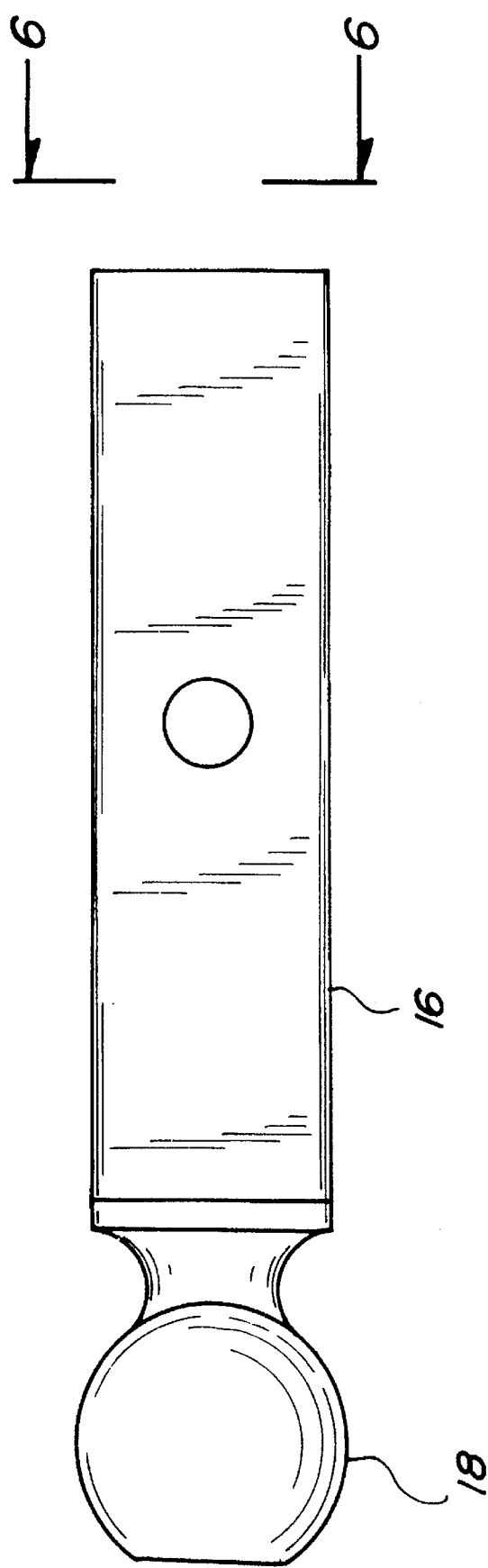
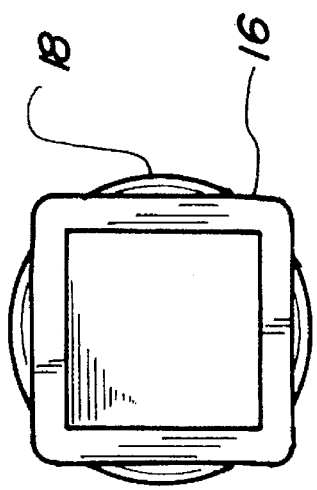

REMOVABLE TRUCK BED TRAILER HITCH

BACKGROUND OF THE INVENTION

1. Field of the Invention

The present invention relates to towing devices and more particularly pertains to a removable truck bed trailer hitch for towing a trailer behind a truck.

2. Description of the Prior Art

The use of towing devices is known in the prior art. More specifically, towing devices heretofore devised and utilized are known to consist basically of familiar, expected and obvious structural configurations, notwithstanding the myriad of designs encompassed by the crowded prior art which have been developed for the fulfillment of countless objectives and requirements.

While the prior art towing devices fulfill their respective, particular objectives and requirements, the prior art does not disclose a removable truck bed trailer hitch for towing a trailer behind a truck which includes a mounting assembly securable to the frame of the truck, a receiving assembly secured to the mounting assembly for receiving a stanchion having a ball hitch coupled to an upper end thereof, and a coupling assembly projecting through both the receiving assembly and the vertical stanchion to removably couple the two together.

In these respects, the removable truck bed trailer hitch according to the present invention substantially departs from the conventional concepts and designs of the prior art, and in so doing provides an apparatus primarily developed for the purpose of towing a trailer behind a truck.

SUMMARY OF THE INVENTION

In view of the foregoing disadvantages inherent in the known types of towing devices now present in the prior art, the present invention provides a new removable truck bed trailer hitch construction wherein the same can be utilized for towing a trailer behind a truck. As such, the general purpose of the present invention, which will be described subsequently in greater detail, is to provide a new removable truck bed trailer hitch apparatus and method which has many of the advantages of the towing devices mentioned heretofore and many novel features that result in a removable truck bed trailer hitch which is not anticipated, rendered obvious, suggested, or even implied by any of the prior art towing devices, either alone or in any combination thereof.

To attain this, the present invention generally comprises a hitch for towing a trailer behind a truck. The inventive device includes a mounting assembly securable to the frame of the truck. A receiving assembly is secured to the mounting assembly for receiving a vertical stanchion having a ball hitch secured to an upper end thereof. A coupling assembly projects through both the receiving assembly and the vertical stanchion to removably couple the two together.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new removable truck bed trailer hitch apparatus and method which has many of the advantages of the towing devices mentioned heretofore and many novel features that result in a removable truck bed trailer hitch which is not anticipated, rendered obvious, suggested, or even implied by any of the prior art towing devices, either alone or in any combination thereof.

It is another object of the present invention to provide a new removable truck bed trailer hitch which may be easily and efficiently manufactured and marketed.

It is a further object of the present invention to provide a new removable truck bed trailer hitch which is of a durable and reliable construction.

An even further object of the present invention is to provide a new removable truck bed trailer hitch which is susceptible of a low cost of manufacture with regard to both materials and labor, and which accordingly is then susceptible of low prices of sale to the consuming public, thereby making such removable truck bed trailer hitch economically available to the buying public.

Still yet another object of the present invention is to provide a new removable truck bed trailer hitch which provides in the apparatuses and methods of the prior art some of the advantages thereof, while simultaneously overcoming some of the disadvantages normally associated therewith.

Still another object of the present invention is to provide a new removable truck bed trailer hitch for towing a trailer behind a truck.

Yet another object of the present invention is to provide a new removable truck bed trailer hitch which includes a mounting assembly securable to the frame of the truck, a receiving assembly secured to the mounting assembly for receiving a vertical stanchion having a ball hitch coupled to an upper end thereof, and a coupling assembly projecting through both the receiving assembly and the vertical stanchion to removably couple the two together.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an exploded isometric illustration of a removable truck bed trailer hitch according to the present invention.

FIG. 2 is a front elevation view of the invention.

FIG. 5 is an elevation view of a portion of the present invention.

FIG. 6 is an end elevation view as viewed from line 6—6 of FIG. 5.

DESCRIPTION OF THE PREFERRED EMBODIMENT

Figure 3:
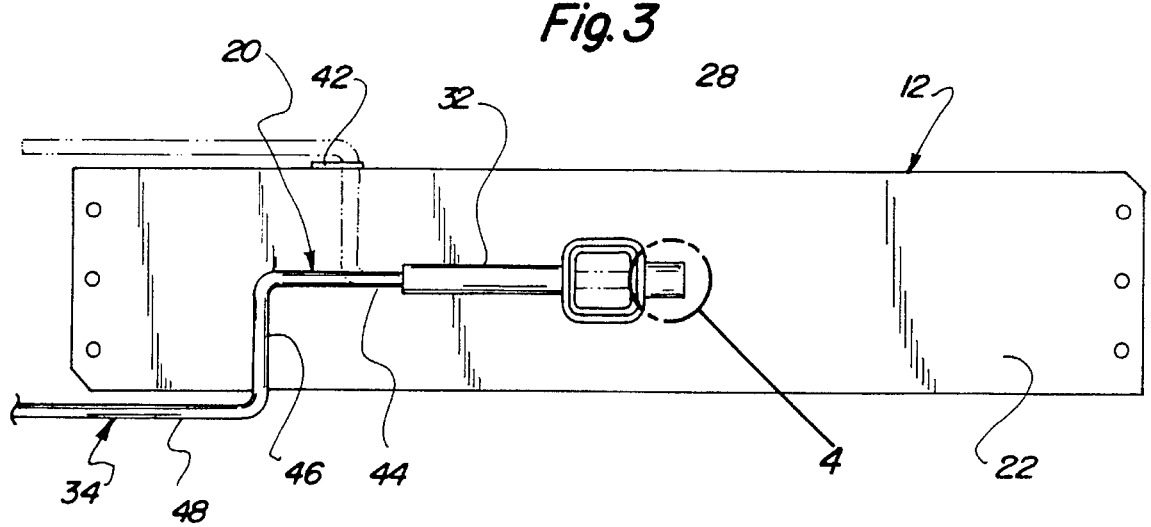
FIG. 3 is a top plan view thereof.

With reference now to the drawings, and in particular to FIGS. 1–6 thereof, a new removable truck bed trailer hitch embodying the principles and concepts of the present invention and generally designated by the reference numeral 10 will be described.

More specifically, it will be noted that the removable truck bed trailer hitch 10 comprises a mounting means 12 for securing to the frame of an unillustrated pickup truck vehicle. A receiving means 14 is coupled to and projects from the mounting means 12 for receiving a vertical stanchion 16 having a ball hitch 18 coupled thereto. A coupling means 20 extends through both the receiving means 14 and the vertical stanchion 16 for removably coupling the ball hitch 18 relative to the mounting means 12, as best illustrated in FIG. 1. By this structure, the ball hitch 18 as well as the vertical stanchion 16 attached thereto can be selectively removed from the receiving means 14 for storage during periods of non-use of the device 10.

As best illustrated in FIGS. 1 through 3, it can be shown that the mounting means 12 according to the present invention 10 comprises an elongated plate 22 of substantially rectangular configuration and having depending side walls 24 extending from longitudinally opposed edges thereof into a substantially spaced and parallel orientation. The depending side walls 24 cooperate with the elongated plate 22 to define the rigid mounting means 12. A plurality of mounting apertures 26 directed through the elongated plate 22 proximal to transverse ends thereof permit the direction of threaded fasteners or the like through the elongated plate for securement to a portion of the unillustrated pickup truck to which the device 10 is to be associated with. By this structure, the mounting means 12 can be easily and removably coupled to the frame of a pickup truck as desired.

With continuing reference to FIGS. 1 through 3, it can be shown that the receiving means 14 according to the present invention 10 comprises a receiving tube 28 having a preferably rectangular cross section. The receiving tube 28 extends through an unlabeled rectangular aperture in the elongated plate 22 of the mounting means 12 and is secured thereto by welding or other securing methods. As shown in FIG. 2, a plurality of brace members 30 extend from a lower distal end of the receiving tube 28 and project from the receiving tube 28 at an oblique angle relative thereto. The brace members 30 are similarly secured to a bottom surface of the elongated plate 22 of the mounting means 12 by welding or the like to further secure and support the receiving tube 28 relative to the mounting means 12. Preferably, the receiving tube 28 of the receiving means 14 includes an unlabeled circumferential flange extending about an upper end thereof having a transverse dimension substantially greater than a transverse dimension of the receiving tube 28 so as to permit reception of a cap within the receiving tube to close the upper end thereof as desired. By this structure, the vertical stanchion 16 can be selectively positioned within the receiving tube 28 to position the ball hitch 18 relative to the mounting means 12.

Figure 4:
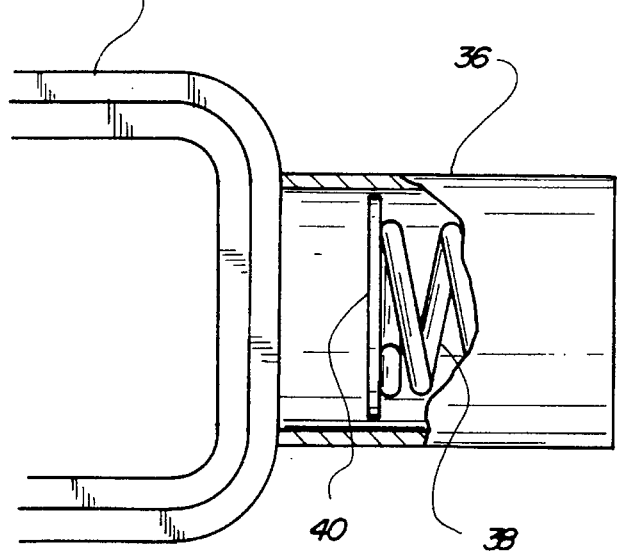
FIG. 4 is an enlarged plan view, partially in cross section, of the area set forth in FIG. 3.

Referring now to FIG. 4 with concurrent reference to FIG. 3, it can be shown that the coupling means 20 according to the present invention 10 comprises a guide tube 32 secured to an exterior surface of the receiving tube 28 of the receiving means 4 and positioned in contiguous communication with a pair of diametrically opposed apertures extending through the receiving tube. The vertical stanchion 16 as shown in FIG. 1, similarly includes a pair of diametrically opposed apertures extending therethrough which permit the direction of a securing pin 34 of the coupling means 20 through the guide tube 32 and the apertures in both the receiving tube 28 and the vertical stanchion 16 to couple the ball hitch 18 relative to the mounting means 12. As shown in FIG. 4, the coupling means 20 desirably includes a spring tube 36 coupled to an opposed side of the receiving tube 28 relative to the guide tube 32 which is similarly positioned into contiguous communication with the diametrically opposed aperture of the receiving tube. A coil spring 38 is captured within the spring tube 36 between a closed end thereof and an abutment plate 40 movably positioned within the spring tube. By this structure, an insertion of the securing pin 34 through the guide tube 32 and into the spring tube 36 will bias the abutment plate against a force of the coil spring 38. As shown in FIGS. 1 and 3, a detent plate 42 is secured to a portion of the mounting means 12 and operates to engage a portion of the securing pin 34 to retain the same in a desired position. By this structure, an insertion of the securing pin 34 through the guide tube 32 and the apertures in both the receiving tube 28 and the vertical stanchion 16 will secure the ball hitch 18 relative to the mounting means 12, whereby the securing pin 34 can be engaged to the detent plate 42 to preclude unintentional disengagement of the vertical stanchion 16 from the receiving tube 28.

As best illustrated in FIG. 3, it can be shown that the securing pin 34 according to the present invention 10 comprises a first elongated pin member 44 having a second elongated pin member 46 projecting substantially orthogonally from a first end thereof. A third elongated pin member 48 projects from a distal end of the second elongated pin member 46 at an orthogonal angle relative thereto so as to extend in a substantially spaced and parallel orientation relative to the first pin member 44. Thus, the first elongated pin member 44 of the securing pin 34 can be positioned within the guide tube 32 and into the spring tube 36 to engage the abutment plate 40 against a force of the coil spring 38. The second pin member 46 can then be rotated into engagement with the detent plate 42 to secure the securing pin 34 relative to the mounting means 12.

Turning now to FIGS. 5 and 6, it can be shown that the vertical stanchion 16 is preferably rectangular or square in cross section so as to be received within the receiving tube 28 of the receiving means 14. The ball hitch 18 is coupled to an upper end of the vertical stanchion 16 by conventional means such as welding or the use of threaded fasteners or the like.

In use, the removable truck bed trailer hitch 10 according to the present invention can be easily installed below a truck bed of an unillustrated pickup truck vehicle. The ball hitch 18 can be selectively secured to the mounting means 12 as desired to facilitate towing of an unillustrated trailer behind the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A removable truck bed trailer hitch comprising:

a vertical stanchion;

a ball hitch coupled to an upper end of the vertical stanchion;

a mounting means comprises an elongated plate of substantially rectangular configuration having depending side walls extending from longitudinally opposed edges of the plate into a substantially spaced and parallel orientation for securing to the frame of a vehicle;

a receiving means comprising a receiving tube extending through an aperture in the elongated plate of the mounting means and secured to and projecting from the mounting means for receiving the vertical stanchion;

a coupling means extending through both the receiving means and the vertical stanchion for removably coupling the ball hitch relative to the mounting means;

the receiving tube is shaped so as to define a pair of diametrically opposed apertures extending through the receiving tube, with the vertical stanchion being shaped so as to define a pair of diametrically opposed apertures extending therethrough, and further wherein the coupling means comprises a guide tube secured to an exterior surface of the receiving tube of the receiving means and positioned in contiguous communication with the pair of diametrically opposed apertures extending through the receiving tube; and a securing pin projecting through the guide tube and the apertures in both the receiving tube and the vertical stanchion to couple the ball hitch relative to the mounting means.

2. The removable truck bed trailer hitch of claim 1, wherein the coupling means further comprises a spring tube coupled to an opposed side of the receiving tube relative to the guide tube; a coil spring captured within the spring tube; and an abutment plate movably positioned within the spring tube, whereby an insertion of the securing pin through the guide tube and into the spring tube will bias the abutment plate against a force of the coil spring.

3. The removable truck bed trailer hitch of claim 2, wherein the coupling means further comprises a detent plate secured to a portion of the mounting means for engaging a portion of the securing pin to retain the securing pin relative to the mounting means.

4. The removable truck bed trailer hitch of claim 3, wherein the securing pin comprises a first elongated pin member having a second elongated pin member projecting substantially orthogonally from a first end thereof, and a third elongated pin member projecting from a distal end of the second elongated pin member at an orthogonal angle relative thereto so as to extend in a substantially spaced and parallel orientation relative to the first pin member, whereby the first elongated pin member of the securing pin can be positioned within the guide tube and into the spring tube to engage the abutment plate against a force of the coil spring, with the second pin member being rotatable into engagement with the detent plate to secure the securing pin relative to the mounting means.

5. The removable truck bed trailer hitch of claim 4, wherein the vertical stanchion is rectangular in cross section, and further wherein the receiving means further comprises a plurality of brace members extending from a lower distal end of the receiving tube and projecting from the receiving tube at an oblique angle relative thereto, the brace members being secured to a bottom surface of the elongated plate of the mounting means to secure and support the receiving tube relative to the mounting means.

6. The removable truck bed trailer hitch of claim 5, wherein the receiving tube includes a circumferential flange extending about an upper end thereof having a transverse dimension substantially greater than a transverse dimension of the receiving tube so as to permit reception of a cap within the receiving tube to close the upper end thereof.

\* \* \* \* \*